June 25, 1946.　　　F. A. NIEMANN　　　2,402,569
KEY RESPONSIVE CALCULATING MACHINE
Filed Oct. 10, 1941　　　6 Sheets-Sheet 1

Fig.1

Inventor.
Frederick A. Niemann
BY:
Charles B. Rasmussen
Atty.

June 25, 1946.     F. A. NIEMANN     2,402,569

KEY RESPONSIVE CALCULATING MACHINE

Filed Oct. 10, 1941     6 Sheets-Sheet 2

Inventor,
Frederick A. Niemann
BY:
Charles B. Rasmussen
Atty.

June 25, 1946.  F. A. NIEMANN  2,402,569
KEY RESPONSIVE CALCULATING MACHINE
Filed Oct. 10, 1941  6 Sheets-Sheet 3

Inventor:
Frederick A. Niemann
BY:
Charles B. Rasmussen
Atty.

Inventor.
Frederick A. Niemann
By:
Charles B. Rasmussen
Atty.

June 25, 1946.  F. A. NIEMANN  2,402,569
KEY RESPONSIVE CALCULATING MACHINE
Filed Oct. 10, 1941  6 Sheets—Sheet 5

Inventor:
Frederick A. Niemann
BY:
Charles B. Rasmussen
Atty.

Patented June 25, 1946

2,402,569

UNITED STATES PATENT OFFICE 2,402,569

KEY RESPONSIVE CALCULATING MACHINE

Frederick A. Niemann, Chicago, Ill., assignor to Felt & Tarrant Mfg. Co., Chicago, Ill., a corporation of Illinois Application October 10, 1941, Serial No. 414,405

15 Claims. (Cl. 235—62)

This invention relates in general to calculating machines, and while it has more particular reference to improvements in calculating machines of the power-operated, key-responsive type disclosed in United States Letters Patent No. 2,018,933 dated October 29, 1935, No. 2,021,393 dated November 19, 1935, and No. 2,063,962 dated December 15, 1936, and United States Letters Patent No. 2,224,203 dated December 10, 1940, issued to my assignee, Felt and Tarrant Mfg. Company, it will be apparent that certain features thereof have other and more general valuable application.

In the prior power-operated, key-responsive calculating machines disclosed in the patents above referred to, the mechanism for effecting accumulation upon depression of a key includes a hook member normally elevated and sustained out of contact with a continuously rotating toothed wheel by a spring-lifted lever which is adapted to be moved downwardly through depression of a key to permit the dropping of the hook member into engagement with a rotating toothed wheel. Upon disengagement of the hook member from the wheel, after a set increment of action has been imparted thereto, it is spring lifted to its normal elevated position and means are provided to guard against partial or improper engagement which means also assists and enforces the lifting of the hook to its normal elevated position upon completion of a power stroke. A principal object of the invention is the provision of means which will guard against partial or improper engagement of the hook member with the wheel.

Another important object of the invention is the provision in a calculating machine of the character described of a novel type of toothed wheel which will insure perfect engagement of the hook member therewith under all conditions of operation.

Another important object of the invention is the provision of improved means for retaining said hook member latching means in released position, and of automatic means for releasing said retaining means and returning said hook member latching means to normal position.

Numerous other objects and advantages of the invention will be apparent as it is better understood from the following description, which, when taken in connection with the accompanying drawings, discloses a preferred embodiment thereof.

Figure 1:
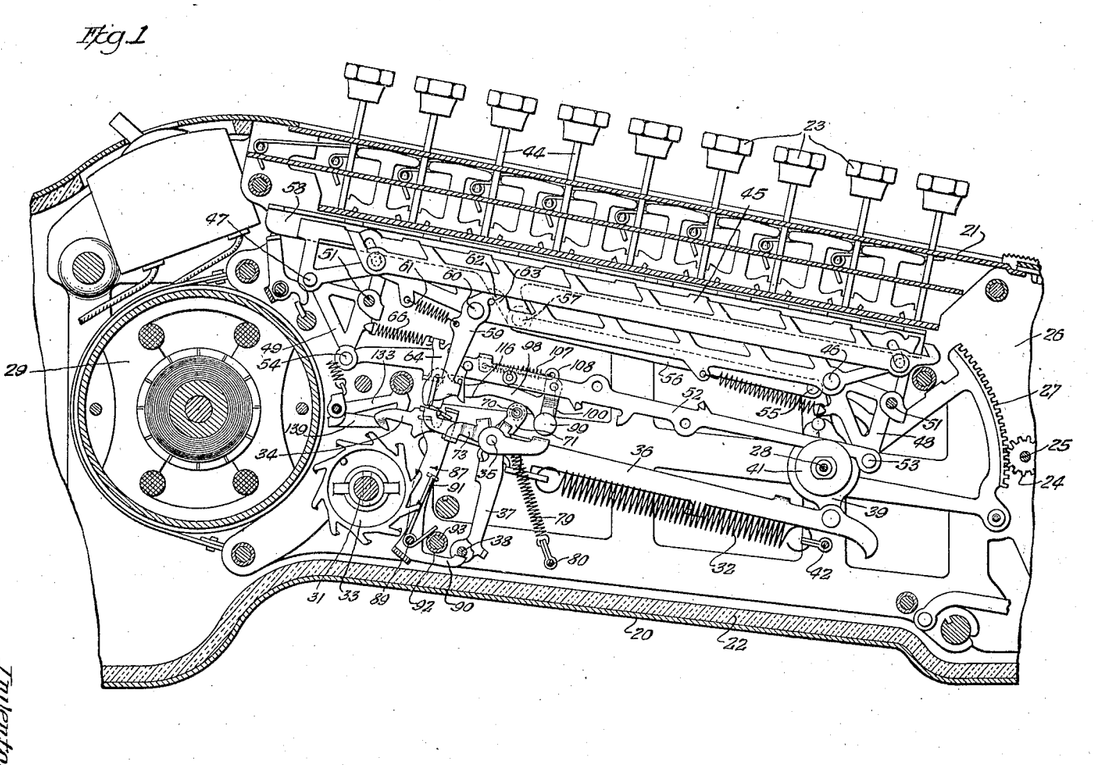
Figure 1 is a vertical section taken longitudinally through a calculating machine embodying the features of the instant invention, and showing the mechanism associated with an individual denominational order of the machine in normal or inoperative position.

Referring to the drawings, and more particularly to Fig. 1, the instant invention is embodied in a power-actuated key-responsive calculating machine of the character shown and described in the patents referred to earlier herein. The working parts are mounted within a casing, generally indicated by reference numeral 20, having a keyboard 21 in its upper portion. Sound deadening material 22 is or may be provided to line the casing in whole or in part. A plurality of keys 23 are arranged through the keyboard 21 which are adapted to be selectively manually depressed to determine the digital degrees of the adding or calculating movements of the machine. These keys 23 are arranged in laterally spaced denominational orders, although only one such order of keys and the mechanism controlled and actuated thereby is illustrated herein.

Each order of keys controls the digital actuation of the associated denominational order of accumulator mechanism, the details of which are not shown in the drawings as they are not believed necessary to an understanding of the present invention. It may be pointed out, however, that each denominational order of the accumulator mechanism includes a pinion 24 rotatably mounted upon a shaft 25 which extends through partition plates 26 arranged between the several organizations of parts associated with each denominational order of the machine.

The adding is accomplished upon depression of a desired key and corresponding depression of a rack sector 27 which is in mesh with pinion 24 of the accumulator mechanism. It will be understood that the rack sector and the control and actuating mechanism therefor is duplicated for each denominational order of the calculating machine.

The rack sector is mounted upon a shaft 28 which extends through the partition plates and is adapted to be moved downwardly on an idle or setting stroke in amount determined by the digital value of the key depressed, this amount increasing in graduating steps from one to nine. The downward movement of the sector is accomplished by an electric motor, generally indicated at 29, which through suitable gearing continuously drives a main power shaft 31, and is returned on its adding stroke by an actuating spring 32, all as fully described in said prior patents.

A toothed wheel 33 is fixed upon the power shaft 31 for each denominational order or column of keys and such said toothed wheel is adapted to be engaged by a hook 34 pivotally connected on a stub shaft 35, to the rear end of a bar or actuating link 36. The rear end of the link 36 is also pivoted on said stub shaft 35, connecting it to the upper end of an upstanding guide arm 37 in turn pivoted on a cross-shaft or pivot member 38 extending through the partition plates 26. The link 36 is pivoted at its other or front end to one arm 39 of a suitable compensating clutch mechanism, generally indicated at 41, which is mounted on the shaft 28. The rack sector 29 is also connected to the slip clutch mechanism 41. The spring 32 is anchored at its forward end at 42 to the adjacent partition plate 26 and is connected at its rear end to a lateral extension 43 of the bar or link 36.

Referring to Fig. 1, depression of any key 23 causes the hook 34 to be depressed into engagement with the toothed wheel 33 to move, through the clutch mechanism, the sector into set position. The depression of a key 23 causes its shank 44 to engage and depress the top bar 45 of a parallel motion device, which is pivoted at the front at 46 and at the rear at 47 to levers 48 and 49. The levers 48 and 49 are pivoted in turn upon cross shafts 51 extending through the partition plates 26. The bottom bar or link 52 of the parallel motion device is pivotally connected to lever 48 at 53 and to lever 49 at 54. It will be understood from the prior patents referred to hereinbefore that the parallel motion device is normally held in elevated position and that the device is so constructed that depression of any key 23 results in the bar 45 being moved downwardly in the direction of the key shank 44, and in the bar 52 being moved forwardly (to the right in Fig. 1). a set distance.

The rack sector 27 is pivoted upon a cross shaft 28 extending through the several denominational orders of the machine, as earlier explained, and is pivotally connected at 55 to the forward end of a link 56. The rear end of the link 56 is pivotally connected at 57 to a downward extension on a movement controlling bar 58. The bar 58 is mounted for longitudinal sliding movement on the adjacent partition plate 26, and is provided with a plurality of stop lugs extending laterally into the path of the key shanks 44 and spaced progressively further back of the key shanks from the front to the rear of the machine. Consequently, downward movement of the rack sector 27 will be limited to a distance proportionate to the digital value of the particular key 23 which has been depressed.

As earlier explained, the rack sector 27 is connected to a slip clutch mechanism 41 pivotally connected to link 36 which is in turn pivoted adjacent its other end on stub shaft 35 connecting it to the upper end of arm 37. The hook 34 is pivotally mounted at its front end on the stub shaft 35, and is adapted to be moved downwardly in response to the depression of a key 23, in a manner to be later described, into engagement with the toothed driving wheel 33 secured to the power shaft 31.

Since the power shaft is rotating in a counter-clockwise direction, viewing Fig. 1, engagement of the hook 34 with the toothed wheel 33 will pull the link 36 toward the rear of the machine (to the left in Fig. 1) a set or uniform distance and until the hook is automatically disengaged from the toothed wheel, in a manner to be described more fully hereinafter. The link 36 extends the actuating spring 32 and moves the rack sector 27 downwardly on an idle stroke a variable amount, depending upon the digital value of the key depressed. Release of the hook 34 permits the spring 32 to return the rack sector 27 to its normal position of Fig. 1, in which return movement it imparts the degree of digital advancement to the accumulator that corresponds to the value of the key 23 depressed. The slip clutch 41 permits relative movement between the link 36, which has a set increment of action imparted thereto, and the rack sector 27, which is stopped at selected points by the movement controlling bar 58, to enable the accomplishment of this result.

A downwardly extending dog 59 (Figs. 1 and 2) is pivotally mounted at 60 on bar 45 of the key-operated parallel motion device hereinbefore described. A spring 61 attached at one end to an arm of bar 45 and at the other end to the dog 59 yieldingly holds a stop shoulder 62 on the dog against a companion stop shoulder 63 on the bar 45. Depression of any key 23 results in downward movement of the dog 59 parallel to the movement of the key shank to cause engagement of the hook 34 with the toothed wheel 33 in a manner to be described hereinafter.

Figures 5, 6, 7, 8, 9:
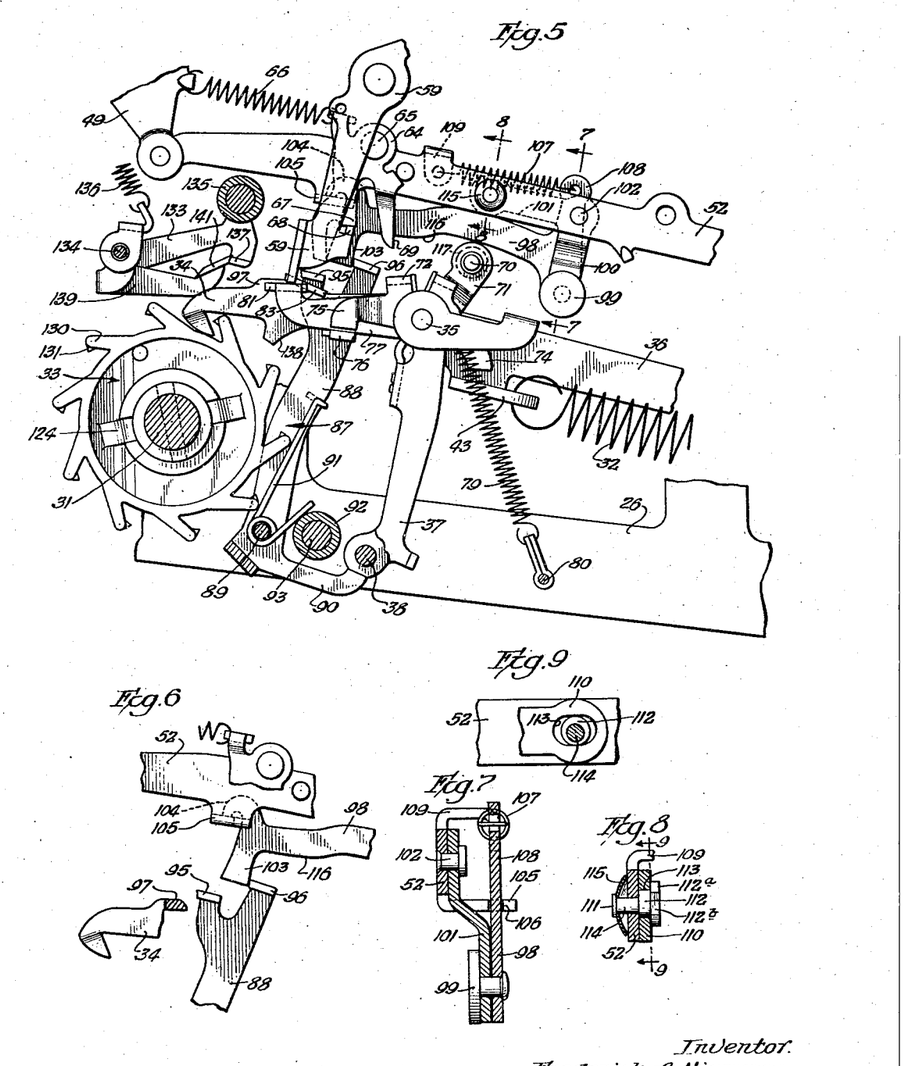
Fig. 5 is a view similar to Fig. 2 showing the mechanism in the position which it assumes immediately following the depression of a key.
Fig. 6 is a view similar to Fig. 3 showing the position assumed in Fig. 5.
Fig. 7 is a detail, transverse, vertical section taken substantially on the line 7—7 of Fig. 5.
Fig. 8 is a detail, transverse, vertical section taken on the line 8—8 of Fig. 5.
Fig. 9 is an elevational view taken on the line 9—9 of Fig. 8.
Figure 10:
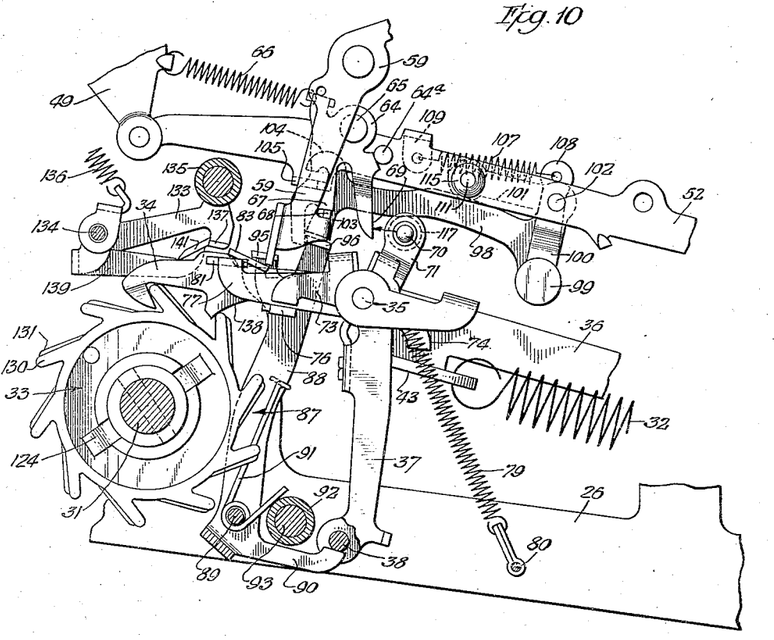
Fig. 10 is a view similar to Fig. 2 showing the position which the mechanism assumes during operation at the beginning of the release and return of the hook and the power trip mechanism latch member to normal, operative position.

In order to retain the key 23 and associated mechanism in depressed or operated position until just prior to release of the hook 34 from the wheel 33, to prevent premature depression of another key in the same denominational order and to prevent return of the dog 59 under sharp or staccato stroke before the hook has opportunity to engage the toothed wheel, the following mechanism, more fully described in the above mentioned United States Letters Patent No. 2,063,962, is provided. Briefly that mechanism comprises a latch member 64 pivotally mounted on the bar 52, as shown at 65 in Fig. 2, and yieldingly held against a suitable stop pin 64a on the bar 52 by a spring 66 connected at one end to the lever 49 (Fig. 2) and at the other end to the latch member 64. The latch member 64 is provided with a short engaging leg 67 which engages the upper surface of a laterally projecting shoulder 68 on the dog 59 when the latter is depressed, as shown in Figs. 5 and 10. The engaging leg 67 is normally positioned out of engagement with and rearwardly of the shoulder 68. Such latching of the dog 59, the parallel motion device and the key 23 in depressed or operated position results from the accompanying forward movement of the bar 52 upon which the latch 64 is pivotally mounted. During such forward movement of the bar 52, the latch member 64 is rotated in a clockwise direction, viewing Figs. 1 and 10, as later more fully described, against the action of the spring 66 and until the engaging leg 67 clears the shoulder 68 on the dog 59. The spring 66 then functions to swing the latch member 64 in a counter-clockwise direction into the latching position shown in Fig. 5.

The following mechanism is provided to automatically release the dog 59 just prior to release of the hook 34 from the toothed wheel 33 and, since such mechanism is fully disclosed in the above mentioned United States Letters Patent No. 2,021,393, it will be only briefly described herein. The dog latch member 64 is provided with a finger 69 and a second downwardly extending leg 69a, the lower portion of the finger 69 being disposed in the path of movement of a laterally extending pin 70 on an upward extension 71 of the guide arm 37, when the latch 64 is in its operative or forward position of Fig. 5. Rearward movement (to the left in Fig. 5) of the guide arm 37, which is caused by engagement of the hook 34 with the toothed wheel 33, results in the pin 70 moving the engaging leg 67 of latch member 64 out of engagement with the dog 59, against the action of the spring 66, just prior to the release of the hook 34 from the wheel 33. Such release of the dog 59 from the engaging leg 67 will enable the return of the former, together with the key 23 which was depressed and the parallel motion device, to the normal position of Fig. 1.

Figure 2:
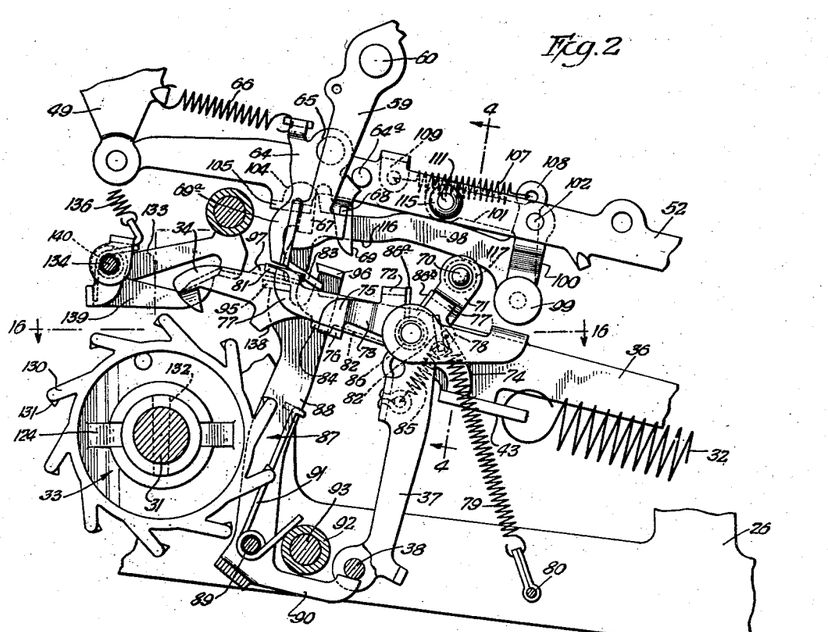
Fig. 2 is an enlarged fragmentary view similar to Fig. 1, with parts omitted, showing the parts in normal or inoperative position.
Figure 16:
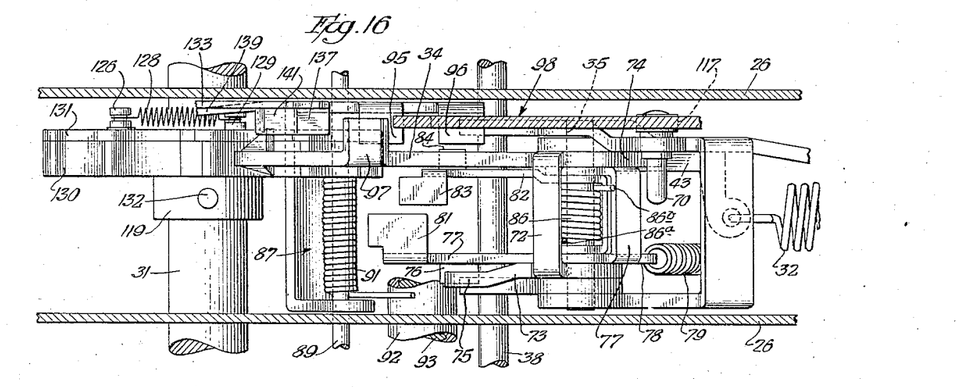
Fig. 16 is a detail sectional plan view taken substantially on the line 16—16 of Fig. 2.

Depression of the dog 59 by a key 23 accomplishes engagement of the hook 34 with the rotating toothed wheel 33 in the following manner. Viewing Fig. 16, it will be seen that the hook member 34 comprises a main hook portion having a cross bar or extension 72 formed adjacent its forward end and extending horizontally above the main portion to join the main portion with a leg 73 lying parallel therewith. The main portion of the hook 34 is provided with a tail 74 which is adapted to engage the lateral extension 43 of the link 36 (Figs. 2 and 5) to limit upward movement of the rear end of the hook member, or clockwise movement thereof in the drawings, relative to the bar. The leg 73 terminates at its rearward end in a tail portion 75 which cooperates with a lateral extension or foot 76 on a spring-lifted lever 77 (Figs. 2 and 5). The lever 77 is pivotally mounted on the stub shaft 35 intermediate the legs of the hook member 34 (Fig. 16), and is provided with a lateral extension 78 at its forward end to which the upper end of a spring 79 is secured. The lower end of the spring 79 is anchored to a shaft 80 extending through the partition plates 26. The rear end of the lever 77 terminates in a lateral extension or shelf 81 (Fig. 16) with which the lower end of the dog 59 cooperates.

Figure 4:
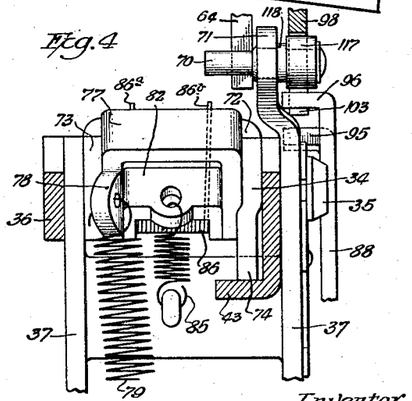
Fig. 4 is a detail, transverse, vertical section taken substantially on the line 4—4 of Fig. 2.

A second lever 82 (Figs. 4 and 16) is also pivoted on the stub shaft 35, between the legs of the lever 77, and terminates at its rearward end in a pair of opposed, upper and lower, lateral extensions or shelves 83 and 84, respectively. The lower shelf 84 extends outwardly and under the main portion of the hook 34, while the upper shelf 83 extends inwardly and slopes upwardly in a rearward direction for a purpose to be later described. A lateral extension provided at the forward end of the lever 82 is connected by a spring 85 to the guide arm 37 to urge the lever 82 and hook 34 in a clockwise direction, viewing Fig. 2. A torque coil spring 86 (Figs. 2 and 16) is mounted on the stub shaft 35 with one end 86a engaging against the forward surface of the cross bar 72 of the hook 34. The other end 86b of the coil spring 86 engages against the rear surface of the lateral extension 78 (Fig. 2) of the spring-lifted lever 77. It will be seen that the spring 86 functions to urge the hook 34 in a counter-clockwise direction, viewing Figs. 2 and 5 of the drawings, relative to the lever 77.

With the hook 34, levers 77 and 82, and springs 79, 85 and 86 arranged as above described, the spring 79, which is much stronger than spring 86, functions to lift the free end of lever 77 upwardly to sustain the hook 34 normally out of contact with the toothed wheel 33 and in the normal or elevated position of Fig. 1. Depression of any key 23 causes the dog 59 to abut against the shelf 81 and depress the lever 77, swinging it in a counter-clockwise direction (viewing Figs. 1, 2 and 5) against the tension of the spring 79. The initial movement of the lever 77 by the dog 59 relieves the hook 34 of the force exerted by the spring 79, since the spring 85 then functions to retain the hook in raised position, through the agency of the lever 82 and the shelf 84 formed thereon, and the foot 76 on the lever 77 is moved out of contact with the tail 75 on the leg 73 of hook 34. Such depression or counter-clockwise movement of the lever 77 relative to the hook 34 also compresses the ends of the torque coil spring 86 together to increase the tension thereof. Just prior to complete depression of lever 77, the tension of the spring 86, as will be presently explained hereinafter, has been increased to a point where it is much greater than that of the spring 85, and the spring 86 then functions to depress the hook 34, or swing it in a counter-clockwise direction, into engagement with the toothed wheel 33.

Means are provided for restraining the dog latching member 64 from latching the dog 59 in depressed position until the hook is moved downwardly by tensioned spring 86. It will be seen from Figs. 1 and 2 that the leg 69a of dog latch 64 is disposed in contact with the rear edge of upwardly sloping shelf 83 on spring lever 82. Upon initial depression of a key 23 which urges the hook downwardly and the bar 52 forwardly, the dog latching member 64 is restrained against forward movement with the bar 52 and is rotated in clockwise direction against the tension of its spring 66, by the engagement of the leg 69a with the rear edge of sloping shelf 83 of spring lever 82 until the key has been sufficiently depressed to properly tension spring 86, at which time the shelf 83 is moved downwardly out of engagement with the leg 69a and spring 66 returns the dog latching member to the latching position of Fig. 5. Accordingly, incomplete depression of a key will not effect either latching of the dog 59 in its depressed position of Fig. 5, or engagement of the hook 34 with the toothed wheel 33.

Figure 3:
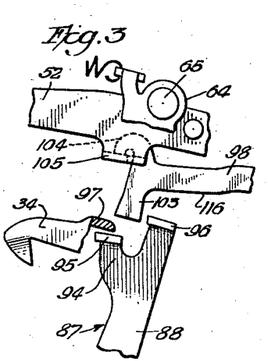
Fig. 3 is an enlarged fragmentary view showing the position of the hook member and hook latching means, and latch release means in Fig. 2.
Figure 11:
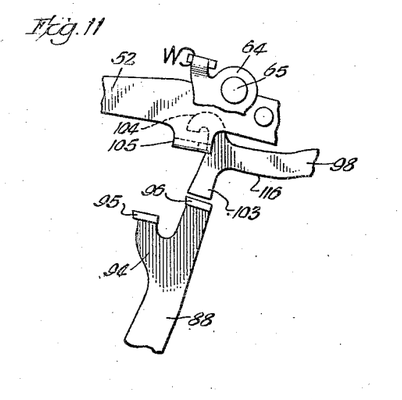
Fig. 11 is a view similar to Fig. 3 showing the position assumed by the parts in Fig. 10.

Means are provided for delaying engagement of the hook 34 with the toothed wheel 33 until the maximum tension of the spring 86 has been secured. A hook latch lever, generally indicated at 87 and having an upstanding arm 88, is pivotally mounted on a cross shaft 89 and is provided with a tail piece 90 which is normally yieldably held in engagement with the under surface of the shaft 38 (Figs. 1, 2, 5 and 10) by a spring 91. The spring 91 is coiled around the shaft 89, with one end engaging against the forward edge of the upstanding arm 88 of lever 87 and the other end engaging a suitable collar 92 on a transverse shaft 93 (Figs. 1, 2 and 5). An arm 94 projecting rearwardly and upwardly from upstanding arm 88 terminates in a lateral extension or shelf 95 (Figs. 3, 6 and 11) and the upper end of the arm 88 is provided with a similar extension or shelf 96. The rear shelf 95 is normally positioned beneath a lateral extension or shelf 97 (Figs. 1, 2 and 16) provided on the hook 34. Upon partial depression of a key 23, with the attendant depression of dog 59, the hook 34 is moved downwardly until the extension 97 engages shelf 95 delaying the dropping of the hook into engagement with wheel 33 until shelf 95 is moved out of engagement with extension 97 as will be presently described.

The shelf 95 of the arm 94 of the latch lever 87 is adapted to be moved forwardly, just prior to complete depression of any key 23 and dog 59, to release the hook 34 and allow it to drop into engagement with the toothed wheel 33. This release of the hook latch lever 87 is delayed as long as possible, through means which may be broadly described as hook latch lever actuating mechanism, and is accomplished in the following manner. A hook-shaped member indicated generally at 98 (Figs. 2, 5 and 10) is pivoted intermediate its ends at 99 to a downward extension 100 of a bell crank 101 which is pivotally connected at 102 to the bar 52. The main or rearwardly extending arm of the hook member 98 terminates in a downwardly extending hook portion 103 and an upper, rearwardly extending nose 104. The nose 104 is adapted to limit downward or counter-clockwise movement of the hook member 98 (Figs. 2, 3, 5 and 6) by abutting against a shelf or stop member 105 provided on the bar 52. The stop member 105 extends outwardly from the bar 52 and has a suitable groove or slot 106 (Fig. 7) formed in the forward edge thereof which serves to guide the member 98 and to prevent any lateral movement of the hook portion 103. The groove 106 is of such depth as will permit the maximum longitudinal adjustment of the hook latch lever actuating mechanism which will be later fully described. The hook member 98 is normally held in operative position as shown in Figs. 1 and 2 by a spring 107 which is connected at one end to an upwardly extending arm 108 of the hook member 98, and at its other end to a suitable extension 109 formed on the bar 52.

When all of the parts are in the normal position of Figs. 1 and 2, the hook portion 103 of the hook latch release member 98 is spaced rearwardly from the shelf 96, on the latching lever 87. When any key 23 is depressed, the resulting forward movement of the bar 52 first carries the hook portion 103 into engagement with the shelf 96 (Figs. 5 and 6), and then, in the final portion of the depression, the hook portion 103 of the hook member 98 rocks the latching lever 87 forwardly to its release position of Figs. 5 and 6. The shelf 95 of the latching lever 87 is accordingly moved out from under the lateral extension 97 on the hook 34 to permit the latter to be engaged with the rotating toothed wheel 33. Since the bar 52 is retained in the forward or operative position of Fig. 5 through the agency of the dog 59 and the dog latch 64, earlier described, the hook-shaped member 98 will hold the hook latching lever 87 in released or inoperative position, against the action of spring 91, as shown in Fig. 5.

Means are provided for timing the hook latch actuating mechanism. Viewing Figs. 2, 5, 8 and 9, it will be noted that the bell crank 101 has a rearwardly extending arm 110 which is secured to the bar 52 by means of an eccentric stud 111. The stud 111 has an enlarged portion or cam surface 112 which is adapted to be rotated within an elongated aperture 113 (Fig. 9) formed in the arm 110. The reduced end 114 of the stud passes through a suitable aperture formed in the bar 52 and is fastened to a blue spring steel cup washer 115 in any suitable manner. The cup washer 115 provides a constant pressure upon the stud 111 and rigidly holds the arm 110 in desired position upon the bar 52. The head portion 112a is provided with two flat surfaces 112b to facilitate rotation of the stud 111. Upon rotation of the stud, the cammed surface 112 will pivot the arm 110 about its pivot point 102 and cause the hook latch release member 98 to be moved either forwardly or backwardly within the longitudinal limits of the elongated aperture 113 to effect the desired adjustment thereof relative to bar 52 to time the movements of the hook latch member 87. The slot 106 earlier described, is of sufficient depth to permit this longitudinal adjustment.

Means are provided for moving the hook latch lever actuating mechanism upwardly, or in a clockwise direction, against the action of the spring 107 to release the hook latching lever 87, and permit it to be returned by the spring 91 to normal or operative position, in advance of the release of the dog latch member 64. This means comprises the pin 70 which extends through the extension 71 of the guide arm 37 and cooperates with the curved, lower surface 116 of the hook member 98. The pin 70 is provided with a roller 117 (Figs. 2, 4, 5 and 10) which may be journaled thereon in any suitable manner, a spacing washer 118 being interposed between the roller 117 and the extension 71 of arm 37. This lower surface of the hook-shaped member 98 is so curved that rearward movement of the arm 71 and pin 70, as earlier described, from the position of Figs. 1 and 2 to the position shown in Fig. 10, will lift the hook-shaped member 98 out of engagement with the shelf 96 of the hook latch lever 87. The lever 87 is thus returned to its operative position of Fig. 10 by the spring 91 well in advance of the release of the hook 34 from the toothed wheel 33, so that there can be no possibility of unintended or accidental re-engagement of the hook with the toothed wheel by the spring 86. The point in the cycle of operations at which such release of the hook latch lever 87 is effected may be advanced or delayed, within limits, by moving the hook-shaped member 98 either forwardly or backwardly, respectively, relative to the lever 52 by adjustment of the earlier described arm 110 of bell crank 101. Since the hook latch lever 87 is returned to operative position before the depressed key 23 and associated mechanism are released and returned to their normal position, proper operation of the hook 34 will be insured upon redepression of the key or subsequent depression of any of the other keys 23, because there can be no possibility of the hook being depressed simultaneously with the depression of the dog 59, thereby assuring the desired tensioning of the spring 86 in the next operation. As the dog latch member 64 is released from the dog 59 by the pin 70, the bar 52 is returned rearwardly under the tension of the spring 66, carrying with it the hook member 98 and disposing the hook portion 103 rearwardly of the shelf 96.

Figure 13:
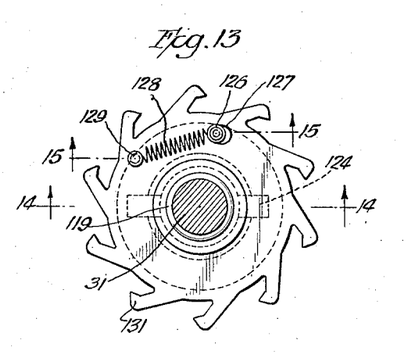
Fig. 13 is an enlarged detail elevational view showing the toothed wheel mounted upon a power shaft taken from the opposite side of the wheel shown in Fig. 1.
Figure 14:
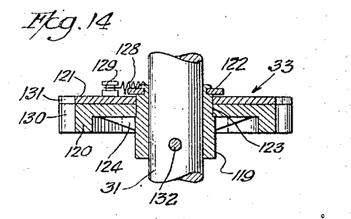
Fig. 14 is a detail sectional view of the toothed wheel taken substantially on the line 14—14 of Fig. 13.
Figure 15:
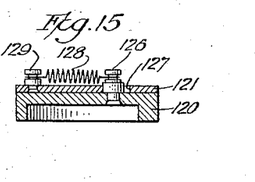
Fig. 15 is a detail sectional view taken substantially on the line 15—15 of Fig. 13.

In addition to the earlier described tensioning of the spring 86 to a maximum to insure rapid movement of the hook 34 into engagement with the rotating toothed wheel 33 regardless of the speed of depression of a key 23, it has been found desirable to provide a toothed wheel of such construction that proper engagement of the hook member therewith will be had regardless of the portion of the wheel with which the hook may first come into contact. Referring particularly to Figs. 2, 13, 14 and 15, the toothed wheel 33 comprises a hub 119, a main toothed disk 120 and an auxiliary toothed disk 121. The two disks 120 and 121 are mounted on a reduced portion of the hub 119 and are held in sliding contact with each other by a spacing washer 122 against which the reduced end portion of the hub is upset (Fig. 14). The outer surface of the main disk 120 is preferably cut away and abuts against a flange 123 formed on the hub 119. The cut away portion of the main disk 120 is provided with a pair of outwardly extending lugs 124 which engage within slots 125 formed in the outer periphery of the flange 123. The main toothed disk 120 is accordingly rigidly secured to the hub 119, and the auxiliary toothed disk 121 is rotatable relative thereto. A pin 126 is secured in any suitable manner to the main disk 120 and extends outwardly through an aperture 127 in the auxiliary disk 121, which aperture is slightly longer than the diameter of that portion of the pin 126 disposed therein to permit limited rotation of the auxiliary disk 121 relative to the main disk 120. A spring 128 is anchored at one end to the pin 126 and at the other end to a pin 129 which is secured in any suitable manner to the auxiliary disk 121.

The main disk 120 of the wheel 33 is provided with ten teeth 130 which slant rearwardly of the machine in the direction of rotation of the wheel and are rounded off at their outer ends to produce a half round surface, this serving like a reinforced pin or lantern wheel. The auxiliary disk 121 is also provided with ten teeth 131 which are similar in all respects to the teeth 130 and coincide laterally therewith, except that the outer end surfaces of the teeth 131 are flattened and the leading edges thereof are pointed, as best shown in Fig. 13. In the normal position of the several parts of the wheel 33, the pointed ends of the teeth 131 are held in advance of the teeth 130 by the spring 128, as shown in Figs. 2 and 5. After complete engagement of the hook 34 with the wheel 33, the auxiliary disk 121 is moved opposite to the direction of rotation thereof and against the action of the spring 128 to the position shown in Fig. 20. In this latter position, the pointed leading edges of the teeth 131 are laterally alined with the leading surfaces of the teeth 130, and such movement of the auxiliary disk 121 relative to the main disk 120 is caused by the nose of the hook 34 which is extended laterally to engage the teeth of both of the disks. The toothed wheel 33 is rigidly secured to the power shaft 31 by a pin 132 which extends through the shaft and the hub 119.

Figure 17:
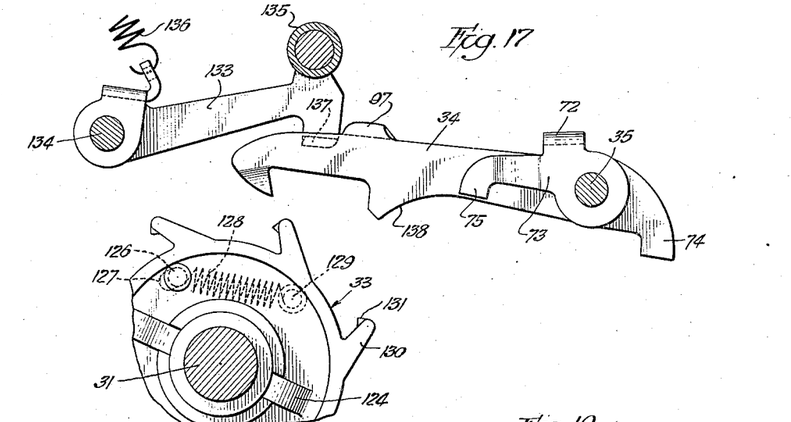
Fig. 17 is an enlarged fragmentary view showing the wheel, hook, and guard means in the normal or inoperative position of Fig. 1.

The purpose of so constructing the toothed wheel 33 is to insure perfect engagement of the hook 34 therewith, regardless of the portion of the wheel which may be first contacted by the nose of the hook in its downward movement by the tensioned spring 86. In Figure 17, the hook 34 is shown in its normal or raised position, and as it is depressed by the tensioned spring 86, as earlier described herein, it is swung in a counterclockwise direction about the shaft 35 as a pivot. In most instances, as the wheel 33 is rotating and the hook 34 is thus depressed, the wheel will be so positioned at the instant of engagement of the hook therewith that the nose of the latter will fall between the teeth of the wheel and be picked up and carried rearwardly by the next following pair of teeth 130, 131. In some cases, however, the hook 34 may come into contact with the wheel 33 in one of three other possible ways.

Figure 18:
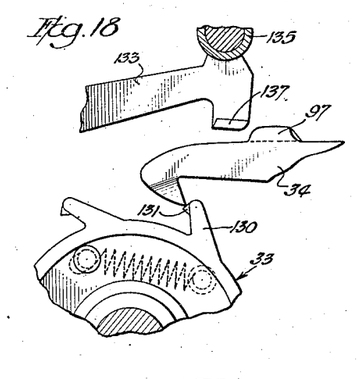
Fig. 18 is a view similar to Fig. 17 showing the hook striking dead center of a tooth end.

The first of these three possibilities is where the wheel 33 is so positioned at the instant of first contact of the hook 34 therewith, that the lower edge of the nose of the latter falls against the top flattened surface of one of the teeth 131. In Fig. 18, the wheel 33 is shown in such a position. Whenever such a condition obtains, the top surface of the contacted tooth 131 will cam the nose of the hook 34 up and over the associated tooth 130 to permit the hook to fall between said teeth and the next following pair of teeth 130, 131. The top surface of each tooth 131 is so angularly disposed that it will effectively perform such a camming action without any possibility of the hook being carried rearwardly at the same time, and the result is the same as though the nose of the hook 34 had initially fallen between the two pair of teeth 130, 131 above referred to.

Figure 19:
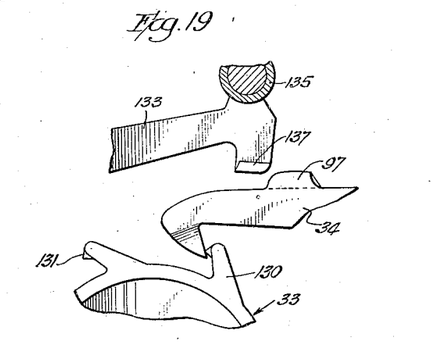
Fig. 19 is a view similar to Fig. 17 showing the position assumed by the parts in engaging below dead center.
Figure 20:
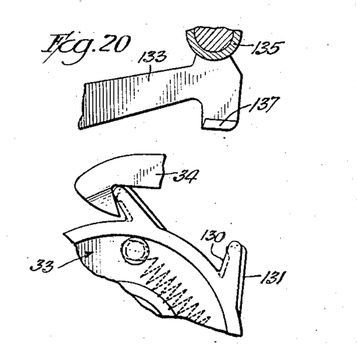
Fig. 20 is a view similar to Fig. 17 showing the position of the parts assumed in Fig. 10.

The second of the three possibilities is where the falling of the hook 34 is so timed relative to the rotation of the wheel 33, that the pointed leading edge of a tooth 131 engages against the hook at some point along the substantially vertical surface of the nose portion thereof, as shown in Fig. 19. It will be noted that while Fig. 19 illustrates that possibility, the angular relationship between the forwardly disposed surface of the hook 34 and the leading edge of the tooth 131 is more clearly shown in Fig. 2. That angular relationship is such that when the pointed edge of a tooth 131 thus engages the hook at substantially any point along such forwardly disposed surface of the nose portion of the hook, it will function to cam the hook downwardly into complete and proper engagement with the toothed wheel, whereupon continued rotation of the wheel 33 will cause the tooth 131 to yield as shown in Fig. 20.

The last of the three possibilities is where the engagement of the pointed leading edge of a tooth 131 is made directly with the lower end or dead center of the nose of the hook 34. In this event, the leverage of the tooth 131 and of the tooth 130 after it has been rotated for a short distance equal to the difference in the widths of the teeth 131 and 130 against the tension of spring 128, will be insufficient to cam the hook downwardly into full engagement with the wheel 33. When this condition occurs, the hook 34 will be carried rearwardly by the toothed wheel 33. While the probability of the hook becoming so engaged with the toothed wheel is rather remote, such engagement might take place, so that guard means, similar to those described in the patents earlier mentioned, are provided for insuring complete and proper engagement of the hook and the toothed wheel under such circumstances.

This guard means comprises a pivoted arm 133 (Figs. 1, 12 and 17) mounted upon an appropriately arranged shaft 134 and having its forward end held up against a spacer on a tie rod 135 by a spring 136. The forward portion of the arm 133 terminates at its lower end in a laterally extending shelf or shoulder 137. The under surface of the shelf 137 is beveled or rounded off, as is the upper surface of the lateral extension 97 on the hook member 34, so that engagement of the latter with the former, when the hook is carried rearwardly, will result in the hook 34 being cammed downwardly thereby into full engagement with the toothed wheel upon continued rotation of the wheel.

Figure 12:
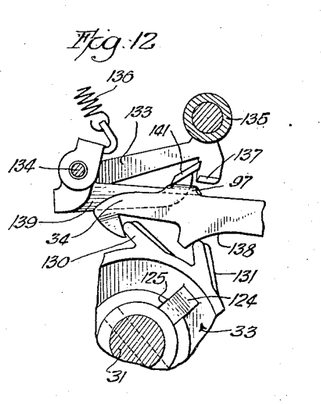
Fig. 12 is a detail fragmentary view of the hook, wheel, and guard means showing the position of the parts prior to release of the hook from the wheel.

As earlier explained, the engagement of the hook 34 with the rotating toothed wheel 33 imparts the power stroke to the mechanism to extend the spring 32, and it is intended that for each adding operation a definite, set power increment or movement be imparted to the actuating link 36, this increment of power being equal and uniform for all the variable settings of the rack sector 27, as determined by the individual keys of the associated denominational order of mechanism. This movement is more than sufficient to impart the maximum down stroke to the rack sector, and is accomplished by positive disengagement of the hook 34 from the toothed wheel 33 when the former reaches a certain point in its rearward travel. The hook 34 is provided on its under surface, intermediate its ends, with a downwardly extending projection 138 (Figs. 2, 5, 10 and 12). The lower surface of the projection 138 curves upwardly and forwardly into the main body portion of the hook and is so spaced from the nose of the latter as to be contacted by the end surfaces of the teeth 130, 131 next succeeding those engaging the nose of the hook when the latter is moved rearwardly by the toothed wheel 33 to its position of Fig. 10. From this point, continued rotation of the wheel 33 causes the teeth 130, 131 which are in contact with the projection 138 to lift or cam the hook 34 upwardly, as shown in Fig. 12, until it is positively disconnected from the wheel as it reaches its rearmost position. Upon disconnection, the spring 32 functions to return the hook 34, bar 36, rack sector 27 and associated parts to their normal positions of Fig. 1, in which return movement the rack sector imparts the degree of digital advancement to the accumulator corresponding to the value of the key 23 which was depressed.

The guard means earlier described also constitute means for assisting and enforcing the lifting of the hook 34 from its initially released position by the spring 79, before it is returned to its normal or forward position, to prevent accidental re-engagement of the hook with the rotating toothed wheel 33, and to insure the lateral extension 97 of the hook being properly disposed above the shelf 95 on the hook latching lever 87 when the hook reaches its normal position. This means comprises the shelf 137 on the arm 133 and an arm or lever 139 which is also pivotally mounted on the shaft 134 (Figs. 2, 5, 10 and 12). The arm 139 is yieldably held in its normal position of Fig. 2 by a coil spring 140 which urges the arm in a clockwise direction to maintain the forward edge of a laterally extending shelf 141 provided on the arm in contact with the rear edge of the shelf 137 on the arm 133. As the hook 34 is being drawn rearwardly by the toothed wheel 33 and is being lifted out of engagement therewith by the teeth 130, 131 contacting the projection 138 thereon, as shown in Fig. 12, the lateral extension 97 on the hook raises the shelf 141 to swing the arm 139 against the action of its spring 140.

Just prior to the hook 34 reaching its initially released position, the lateral extension 97 clears the shelf 141 to permit the arm 139 to be returned to its normal position by the coil spring 140. As shown in Fig. 12, the shelf 141 normally slants downwardly and rearwardly, and, since it is moved forwardly to a certain extent in its downward movement back to normal position, and the forward edge of the lateral extension 97 slants forwardly and downwardly, the rear edge of the shelf 141 will be disposed beneath the forward edge of the lateral extension 97 just prior to complete release of the hook 34 from the wheel 33. Consequently, since the shelf 137 is a substantial continuation of the shelf 141 when the latter is in normal position, and the shelf 95 on the hook latch lever 87 is normally disposed substantially directly adjacent the shelf 137, the lateral extension 97 will ride over these several shelves as the hook 34 is returned forwardly by the spring 32 to prevent accidental re-engagement of the hook with the rotating toothed wheel 33.

Figure 21:
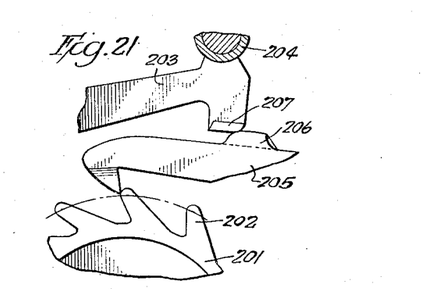
Fig. 21 is a view similar to Fig. 18 showing the position of the parts in prior constructions.

Fig. 21 shows the type of wheel used in the patents earlier referred to herein. The wheel 201 is provided with sixteen teeth 202 having rounded outer ends similar to teeth 130 of disk 120 of the instant invention. The guard arm 203, shelf 207, spacer 204 and hook 205 are identical with similar parts shown herein, but while the lateral extension 206 of hook 205 is similar in construction to extension 97 of hook 34 it is farther removed from the rear extremity of the hook than extension 97 of hook 34.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a key-responsive calculating machine having an accumulator, an actuator for said accumulator, and means for driving said actuator; a rotatable power member adapted to be connected to said driving means by a key-controlled connecting device, said power member comprising a toothed wheel having a cam member yieldably mounted for rotation adjacent and with said wheel and for yielding in the opposite direction for camming the said connecting device into engagement with said toothed wheel to prevent misconnection of said connecting device and said wheel.

2. In a key-responsive calculating machine having an accumulator, an actuator for said accumulator, and means for driving said actuator; a rotatable power member adapted to be connected to said driving means by a key-controlled connecting device, said power member comprising a toothed wheel, and a cam element yieldably mounted on said wheel for rotation therewith and limited yielding movement in the opposite direction for camming said connecting device into the path of the said toothed wheel to prevent misconnection of said connecting device and said wheel.

3. In a key-responsive calculating machine having an accumulator, an actuator for said accumulator, means for driving said actuator, and key-operated mechanism for controlling the operation of said driving means; a rotatable power member adapted to be connected to said driving means by a connecting device which is spring-pressed into engagement therewith under the control of said key-operated mechanism, said power member comprising a first wheel having teeth slanting in the direction of rotation thereof, and a second wheel disposed laterally adjacent to said first wheel and mounted thereon for yielding limited rotation in the opposite direction, said second wheel having cam teeth thereon which normally extend forwardly of the leading edges of the teeth of said first wheel and are adapted to cam said connecting device into the path of the teeth of the first said wheel.

4. In a key-responsive calculating machine having an accumulator, an actuator therefor, means for driving said actuator, and key operated mechanism for controlling the operation of said driving means; a connecting device, a rotating toothed wheel adapted to be connected to said driving means by said connecting device which is pressed into engagement therewith under control of said key operated mechanism, a cam member yieldably mounted adjacent said wheel and rotatable therewith and yieldable a limited distance in the opposite direction for camming the said connecting device into the path of rotation of said wheel, a latch lever normally preventing engagement of said connecting device with said wheel, and means operable by said key-operated mechanism for moving said latch lever to release position during the final increment of movement imparted to said key-operated mechanism.

5. In a key-responsive calculating machine having an accumulator, an actuator therefor, means for driving said actuator, and key operated mechanism for controlling the operation of said driving means, a connecting device, a rotatable power member adapted to be connected to said driving means by said connecting device which is pressed into engagement therewith under control of said key operated mechanism, a cam member yieldably mounted adjacent said power member and rotatable therewith and yieldable a limited distance in the opposite direction for camming the said connecting device into the path of rotation of said power member to prevent misconnection of said connecting device and said power member, a latch lever normally preventing engagement of said connecting device with said power member, means operable by said key-operated mechanism for moving said latch lever to release position, and means operable by said power member for releasing the moving means to permit the return of said latch lever to normal position.

6. In a key-responsive calculating machine having an accumulator, an actuator therefor, and means for driving said actuator, a power clutch comprising a drive member, a key-controlled connecting device adapted when operated to connect said drive member with said driving means, and an auxiliary member movable with and adjacent said drive member, said auxiliary member being yieldable a limited distance in the opposite direction and including cam means for urging said connecting device into full clutching engagement with said drive member upon operation of said connecting device.

7. In a key-responsive calculating machine having an accumulator, an actuator therefor, and means for driving said actuator, a power clutch comprising a key-controlled connecting device connected to the driving means, and a pair of rotatable members engageable by said key controlled connecting device, one of said rotatable members including cam means for urging said connecting device into full clutching engagement with the other of said rotatable members.

8. In a key-responsive calculating machine having an accumulator, an actuator therefor, and means for driving said actuator, a drive member adapted to actuate the driving means, a key-controlled connecting device adapted upon operation to connect said drive member with the driving means to actuate the latter, latch means for normally preventing operation of said connecting device, key controlled means for operating said latch means to release said connecting device, adjustable timing means for timing the operating means whereby the release of said latch means is variable with respect to the operation of said connecting device, an auxiliary member movable with and adjacent said drive member, and cam means on said auxiliary member and yieldable in a direction opposite that of the movement of said drive member for urging said connecting device into full connecting relationship with said drive member when said connecting device is released by said latch means.

9. In a key-responsive calculating machine, a key-controlled power clutch member, a rotatable power member including a rotating toothed wheel, and a toothed cam member yieldably mounted adjacent said wheel, rotatable therewith, and yieldable in the opposite direction for camming said clutch member into clutching engagement with said power member to prevent misconnection of said clutch member and said wheel.

10. In a key-responsive calculating machine, a key-controlled power clutch member, a rotatable toothed wheel, and a toothed element yieldably mounted on said wheel for limited yielding movement in a direction opposite that of the rotation of said wheel and having cam members for camming said clutch member into the path of said toothed wheel to prevent misconnection of said clutch member and said wheel.

11. In a key-responsive calculating machine, a rotatable clutch wheel having teeth slanting in the direction of rotation thereof, an operable clutch member normally resiliently held out of engagement with said clutch wheel, manually actuated means for urging said clutch member into clutching engagement with said clutch wheel, and another wheel mounted on and laterally adjacent said clutch wheel and having cam teeth normally extending forwardly of the leading edges of the teeth of said clutch wheel and yieldable rearwardly from the forwardly extending position to direct said clutch member into clutching engagement with said clutch wheel.

12. In a key-responsive calculating machine having an accumulator and an actuator for said accumulator; means for driving said actuator including a rotatable power member, key-operated mechanism for establishing a driving connection between said actuator and said driving means including a releasable connecting device and spring means energized by said key-operated mechanism for urging said connecting device into engagement with said power member, said power member comprising a toothed wheel and a cam member yieldably mounted adjacent said wheel and rotatable therewith and yieldable in the opposite direction for camming the said connecting device into the path of rotation of said wheel to prevent misconnection of said connecting device and said wheel, a movable latch lever urged to a normal position for releasably restraining said connecting device against engagement with said power member, releasable connecting means between said key-operated mechanism and said latch lever to move said latch lever from normal position to release said connecting device when the final increment of motion is imparted to said key-operated mechanism so as to enable the latter to energize said spring means prior to release of said connecting device by said latch lever to obtain a maximum rate of movement of said connecting device into engagement with said power member, and control means operable upon actuating movement of said actuator by the power member upon establishment of the driving connection between said actuator and said driving means to release said releasable connecting means to permit return of said latch lever to normal restraining position so as to prevent reengagement of said connecting device with said power member except in response to a second depression of a key.

13. In a key-responsive calculating machine having power mechanism, an accumulator mechanism, actuator mechanism for the accumulator mechanism, key-operated mechanism for determining the degree of digital actuation to be imparted to said actuator mechanism by said power mechanism upon depression of a selected key, and means under the control of said key-operated mechanism for connecting said power mechanism and said actuator mechanism, including a connecting device adapted to be urged into engagement with said power mechanism; a latch lever normally urged to latching position to releasably latch said connecting device out of engagement with said power mechanism, releasable means connected to said key-operated mechanism for moving said latch lever to release position upon depression of a key, and control means operable upon actuating movement of said actuator mechanism by said power mechanism upon establishment of driving connection between said actuator mechanism and the power mechanism for releasing said moving means to permit the return of said latch lever to latching position so as to prevent re-engagement of said connecting device with said power member except in response to a second depression of a key.

14. In a key-responsive calculating machine, a rotatable power clutch member, an operable clutch member, means including a spring yieldably holding said operable clutch member in declutched position with respect to said rotatable clutch member, spring means for urging said operable clutch member toward clutching engagement with said rotatable clutch member, manually operable means for energizing said last mentioned spring means to overcome said first spring means, a latch lever normally urged to latching position to releasably hold said operable clutch member in declutched position, releasable connecting means between said key-operated mechanism and said latch lever to move said latch lever from normal position to release said operable clutch member when the final increment of motion is imparted to said manually operable means so as to enable the latter to energize said last mentioned spring means prior to the release of said operable clutch member by said latch member to obtain a maximum rate of movement of said operable clutch member toward said rotatable clutch member, and control means operable with said operable clutch member from said rotatable clutch member during clutching engagement thereof for releasing said latch-moving means from the latch lever to permit return of said latch lever to normal position so as to prevent reengagement of said operable clutch member and said rotatable clutch member except in response to an additional operation of said manually operable means.

15. In a key-responsive calculating machine, a driven clutch member, an operable clutch member adapted to be moved into clutching engagement with said driven clutch member, a latch lever normally preventing engagement of said operable clutch member with said driven clutch member, means urging said latch lever to normal position, manually operable means for controlling the engagement of said operable clutch member including means for urging said operable clutch member into clutching engagement with said driven clutch member, latch-moving means operated by said manually operable means for moving said latch member to release said operable clutch member, and means operable with said operable clutch member from said driven clutch member during clutching engagement thereof for releasing said latch-moving means from the latch lever to permit the return of said latch lever to normal position so as to prevent reengagement of said operable clutch member with said driven clutch member except in response to an additional operation of said manually operable means.

FREDERICK A. NIEMANN.